United States Patent

[11] 3,572,909

[72] Inventors Robert E. VanPatten
Dayton, Ohio;
Paul W. Lappin, San Antonio, Tex.
[21] Appl. No. 847,585
[22] Filed Aug. 5, 1969
[45] Patented Mar. 30, 1971
[73] Assignee the United States of America as represented by the Secretary of the Air Force

[54] INFRARED OPTOMETER
5 Claims, 5 Drawing Figs.
[52] U.S. Cl. ..................................... 351/6, 351/9, 351/16
[51] Int. Cl. ............................................ A61b 3/10
[50] Field of Search .......................................... 351/1, 6, 7, 9, 14, 16, 39

[56] References Cited
UNITED STATES PATENTS
2,367,855 1/1945 Ettinger .................... 351/16X
2,385,503 9/1945 Glasser ...................... 351/6
OTHER REFERENCES
F. W. Campbell et al., JOSA, " High Speed Infrared Optometer," Vol. 49, 03, March 1959, pp. 268— 272 (351— 6)

J. Warshawsky, JOSA, " High-Resolution Optometer for Continuous Measurement of Accommodation," Vol. 54, 03, March 1964, pp. 375— 379 (351— 6)

Primary Examiner—David Schonberg
Assistant Examiner—Paul A. Sacher
Attorneys—Harry A. Herbert and Charles H. Wagner ABSTRACT: An infrared optometer device which allows manual or automatic measurement, under either local or remote control, of the refractive index of a man or animal eye in which a collimated beam of light is directed through an infrared filter and by a "beam splitter" mirror at 90° into a subject's eye, and the light reflected by the fundus of the eye and exiting back through the lens of the eye from the interior through the beam splitter is converged by a suitable lens toward a focal point at which is located an adjustable photo sensor which detects maximum intensity of the exit beam illumination, calibrated in terms of dioptric change in refractive status. The positioning of the photo sensor in order to detect the maximum intensity of the reflected illumination through the lens of the eye is calibrated in terms of dioptric change in the reflective status. The positioning of the photo sensor is controlled manually or remotely, and completely automatic and continuous operation is contemplated.

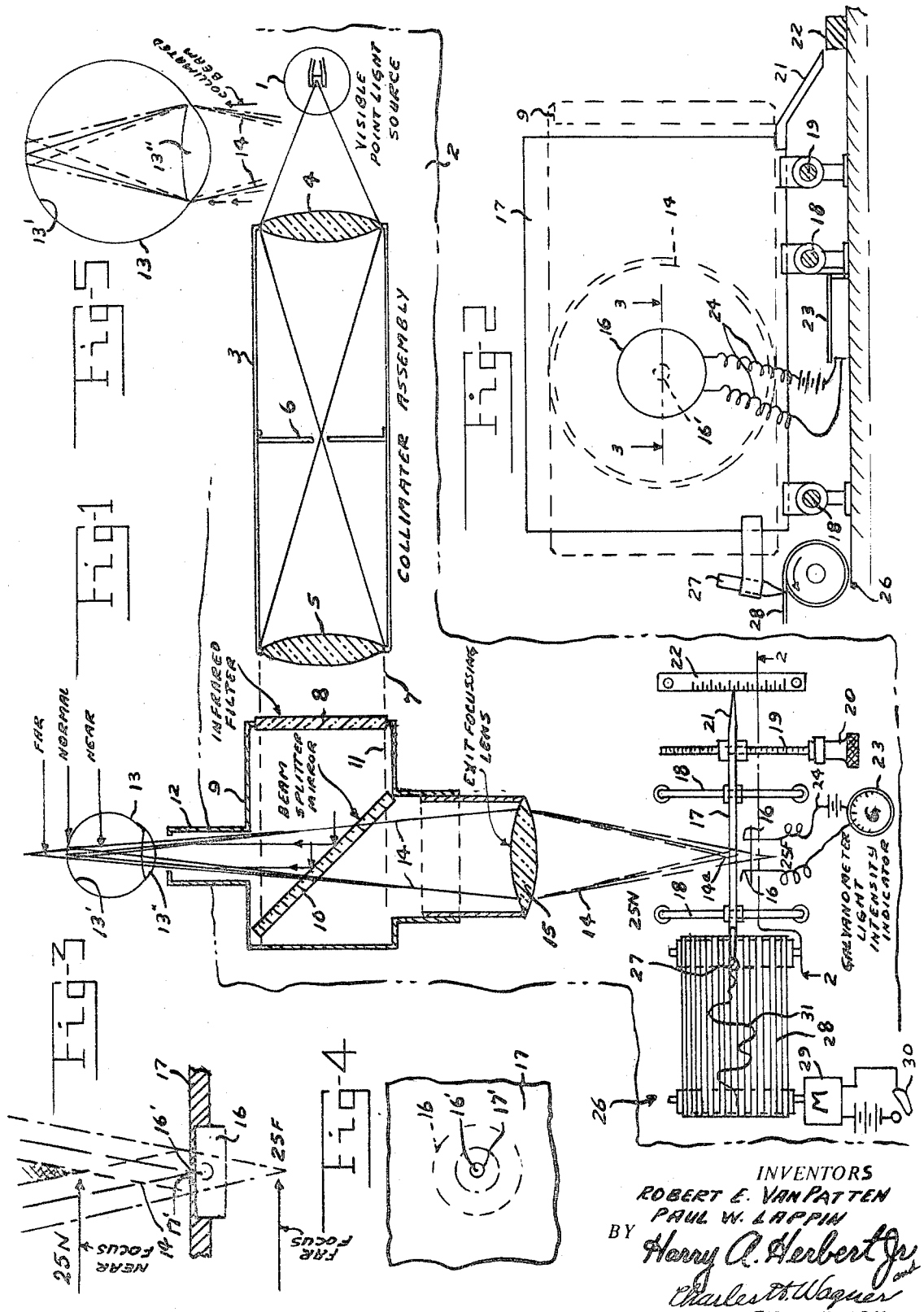

INFRARED OPTOMETER

BACKGROUND OF THE INVENTION

The invention is designed to improve the method and means for determining the refractive state human eye and eliminate the employment of the usual "trial" method which is of no value in measurement of the refractive state of the eye in the case of a nonresponsive subject or an animal.

SUMMARY OF THE INVENTION

The device offers an accurate and continuous assay of the refractive state of the human eye, or the eye of an animal, by very simple means and does not depend upon the comments from an individual being examined, as does the usual expensive refractive equipment and trail method for determining proper corrective eye lenses. Additionally, the device of the invention may provide means for determining and recording the refractive state of an animal's eye and provides a necessary research tool for use in Aerospace Medicine situations in which it is impossible for an optometrist or ophthalmologist to accompany a subject for the purpose of determining changes in the refractive status of the eyes due to the effect of, for example, increased gravitational stress or weightless flight or in circumstances where a continuous record of refractive changes are required in the human or animal eye, and further provides means for solving the problem of obtaining such information in certain circumstances by untrained personnel, in mass screening in Public Health Settings, where it is desired to assay the refractive errors of large numbers of people. The device comprises means for projecting a collimated beam of light through an infrared filter and through an inclined "beam splitter" mirror assembly into a subject's eye so that the light excited or reflected back from the interior of the eye through the lens of the eye and is converged through a suitable fixed exterior lens toward a focal point at which is located a photosensor. Depending upon the refractive state of the eye, the focal point position will change and means are provided to adjust the position of the photosensor into register with the point of maximum intensity of the reflected light from the eye. The positioning of the photosensor or detector may be manually adjusted or controlled locally, or remotely, or may be made and adjusted continuously with suitable associated refractory index or scale means for indicating the degree of refractory state of the eye at various changes in the location of the focal point of the reflected or exiting light beam.

BRIEF DESCRIPTION OF THE DRAWINGS

Like reference characters refer to like parts in the several figures of the drawings, in which:

FIG. 1 is a schematic plan view, partly in section.
FIG. 2 is a sectional view taken about on line 2—2 of FIG. 1.
FIG. 3 is a fragmentary sectional view taken about on the plane indicated by line 3—3 in FIG. 2.
FIG. 4 is an enlarged fragmentary plane view of the central portion of the adjustable screen, showing the central opening and the location of the light sensing unit therein.
FIG. 5 is an enlarged schematic view of a patient's eye showing how rays from infinity vary in normal, near and farsighted subjects.

Referring to the drawings, the reference numeral 1 denotes a visible and preferably a point light source which is fixed on a suitable base or support 2, while the numeral 3 indicated a light collimating assembly or unit comprising the lenses 4 and 5 and intermediate diaphragm 6, for projecting a collimated beam of light 7 through an infrared filter plate 8 which is fixed in a suitable casing 9 carried by the support 2.

A beam splitter plate or partially silvered mirror 10 is disposed in the casing 2 in inclined relation across the collimated infrared beam 11, and preferably in a 45° relation as shown, so as to reflect the collimated infrared beam 11 to the right, as shown into and through the eyepiece piece 12, through a suitable opening in outer end of the eye piece 12.

The reference numeral 13 denotes schematically the eye of the subject being examined, comprising the pupil and lens. The light entering the eye is reflected from the fundus 13' of the eye 13 and exits through the eye lens and pupil 13" back through the beam splitter plate 10 in the form of an expanding exit beam splitter plate 10 in the form of an expanding exit beam 14 at 90° to the initial collimated beam 8.

Following the beam splitter 10 in the exit path from the eye 13 is an exit beam focusing lens 15 of any convenient focal length.

A photosensor or photocell 16 is normally located at the focal point of the lens 15. For the normal eye, without refractive error, the maximum intensity of light of the exit beam would, of course, be located at the focal point of the lens 15. If the eye being examined is, however, either near or farsighted, then, the exit beam, after passing through the lens 15, will converge to a focus either nearer to, or farther away from, the aforesaid lens 15. For this reason, the aforesaid photo sensor 16 is uniquely movably carried on the support 2 for adjustment along the axis of the exit beam 14 and, in this manner, the exact position of maximum light intensity may be located. Of course, the distance through which the photosensor or photocell 16 must be moved to pickup the new point of maximum light intensity or focus may be calibrated in terms of the dioptric change in refractive error.

One form of mounting for the photosensor 16 may comprise an opaque adjustable screen member 17 which is mounted to travel on guide rods 18, and the provision of a micrometric lead screw 19 that is rotatable by the knob 20 for adjusting the screen 17 (and photocell 16) toward or away from the lens member 15. The screen 17 may be provided with a suitable pointer 21 that registers with a calibrated scale 22 that is fixed on the support 2, and as seen in FIG. 3, may have the photosensor 16 mounted behind it, with reference to the converging exit beam 14.

A suitable small central aperture 17' may be provided in the screen 17 with the photocell light sensor element 16' mounted on the axis of the exit beam 14, directly behind the opening 17' so that substantially only a small area of the exit beam 14 can strike and energize the photo sensor 16.

The photosensor 16 is, of course, preferably connected through an amplifier, to a suitable indicator or gauge, such as a galvanometer 23, by the conductors 24 so as to indicate the maximum concentrated light or illumination energy or amount of light of the beam 14 which registers on the sensor 16.

With the subject's eye 13 located in the same position in front of the eyepiece 12, it can observed that the point of maximum light concentration of the reflected beam 14 will be different for different subject's eyes. The eye of a nearsighted subject will tend to focus the beam 14 over an area nearer the exit or focusing lens 15, for the instance at 25n while a subject that is farsighted will locate the exit beam area of maximum light concentration at a different or advanced point for instance at 25f. It will also be observed that the "spread" of the beam at the sensor 16 and through the aperture 17' on the photosensor 16 to the points or areas 25n will be greater over the area on the screen 17 concentrically surrounding the aperture 16' and therefore the effective light concentration will be less than that at the focal point or area nearer the focal point, and the light energy striking the cell through the aperture 17' and the sensor 16 will be correspondingly less.

By manipulating the knob 20, the screen 17 can be moved to register the photocell 16 in the beam 14 at the point of maximum light concentration in the converging exit beam 14, which of course, would be at the point spaced in the exit beam 14 from the lens 15 at a predetermined different distance, depending upon the eye of the particular subject being examined, where the light intensity is highest. As the screen 17 is adjusted, the pointer 21 will indicate the desired calibration, for instance in diopters, on a properly indexed scale such as the scale 22 fixed on the support and determine if a person's sight is normal, near, or far "sighted," and how much. If desired, a conventional recorder, indicated generally at 26 may be provided, comprising a marking element or pen 27 which engages a moving suitably calibrated paper strip 28 driven at a predetermined constant rate by a motor 29 when a switch such as 30 is closed. If the screen 17 is shifted to keep the photosensor 16 in register with the maximum effective concentrated light energy of the exit beam 14, as the subject's eye responds to different conditions effecting the eye "sight" and focus of the subject under test, the pen 27 will record and provide a permanent graph line 31 or record on the uniformly moving strip of graph paper 28.

We claim:

1. An infrared optometer device comprising a support, a concentrated light source, light collimating means carried by said support for projecting a collimated light beam in a predetermined direction away from said light source, an infrared filter plate fixed across said collimated light beam to form an infrared collimated light beam, a beam splitter means fixed across said infrared collimated light beam in 45° angular relation for directing a predetermined portion of said infrared collimated light beam therefrom at 90°, an eyepiece concentrically fixed (in predetermined relation) on the axis of said reflected infrared collimated light beam, a fixed eye inspection position located in said reflected infrared collimated beam on the axis thereof for directing said infrared collimated light beam into the eye of a subject through the cornea and lens of the eye when located in said eye inspection position to converge said reflected infrared beam onto the fundus of a subject's eye to form an outwardly reflected expanding exit beam from the fundus through the lens of the eye diverging outwardly through said beam splitter mirror, a focusing lens member fixed on the central axis of said exit beam for converging said exit beam toward a focal point proportional in distance to the convergence of the entrance beam between the lens and fundus of the subject's eye, photosensor means movable in said converging exit beam for receiving the maximum concentrated light energy thereon, means for adjusting said photosensor means in said exit beam toward and away from said focusing lens means to locate the position representing the point of maximum light concentration thereon, and indexing means responsive to movement of said sensor for automatically indicating the maximum light concentration thereon.

2. A device as set forth in claim 1 in which the photosensor includes an opaque screen, means supporting the screen normal to the axis of converging exit beam and includes a small light admitting aperture concentric to the axis of the exit beam with said photosensor located concentrically behind the aperture to receive the proportion of the concentration of light in the exit beam entering the aperture, and means for moving the screen in the exit beam to admit the strongest light concentration through the aperture to register on the photosensor.

3. Apparatus as in claim 2 including a pointer on said screen movable therewith and a scale fixed on the support for registration of the pointer thereon to denote the position of the screen at the location where the photosensor receives the maximum degree of light concentration from the exit beam.

4. A device as set forth in claim 3 including micrometer screw means carried by the support and engaging said screen for parallel movement thereof along the axis of exit with the axis of the aperture concentric to the axis of the exit beam.

5. Apparatus as set forth in claim 4 including calibrated recording means carried by said support and indicating marking means fixed to said screen for continuously recording the movements of said screen by said micrometer screw adjusting means.